United States Patent
Sabath et al.

(10) Patent No.: US 10,897,497 B2
(45) Date of Patent: Jan. 19, 2021

(54) AUTOMATED INFRASTRUCTURE UPDATES IN A CLUSTER ENVIRONMENT THAT INCLUDES CONTAINERS

(71) Applicant: International Business Machines Corporation, Armonk, NY (US)

(72) Inventors: Mariusz Sabath, Ridgefield, CT (US); Jia Jun Brandon Lum, White Plains, NY (US); Alaa Youssef, Valhalla, NY (US); Malgorzata Steinder, Leonia, NY (US); Asser Nasreldin Tantawi, Somers, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/188,716

(22) Filed: Nov. 13, 2018

(65) Prior Publication Data

US 2020/0153898 A1    May 14, 2020

(51) Int. Cl.
| | |
|---|---|
| *H04L 29/08* | (2006.01) |
| *G06F 9/48* | (2006.01) |
| *G06F 8/65* | (2018.01) |
| *G06F 9/50* | (2006.01) |
| *H04L 12/24* | (2006.01) |

(52) U.S. Cl.
CPC ............ *H04L 67/1031* (2013.01); *G06F 8/65* (2013.01); *G06F 9/4856* (2013.01); *G06F 9/4881* (2013.01); *G06F 9/5038* (2013.01); *H04L 41/082* (2013.01); *H04L 41/0886* (2013.01)

(58) Field of Classification Search
CPC . H04L 41/5054; H04L 41/5009; H04L 43/04; H04L 41/082; H04L 67/1008; H04L 67/1034; G06F 11/301; G06F 11/3006; G06F 11/3051; G06F 11/3433; G06F 2201/865; G06F 8/65; G06F 9/50; G06F 9/505; G06F 9/5077
See application file for complete search history.

(56) References Cited

U.S. PATENT DOCUMENTS

| | | | |
|---|---|---|---|
| 7,020,706 B2 | 3/2006 | Cates et al. | |
| 8,375,108 B2 | 2/2013 | Aderton et al. | |
| 8,521,853 B2 | 8/2013 | Rathunde et al. | |
| 9,286,052 B1 | 3/2016 | Solan et al. | |
| 10,355,946 B1* | 7/2019 | Dolas | H04L 43/04 |

(Continued)

OTHER PUBLICATIONS

Sanjay P. Ahuja et al., "The state of high performance computing in the cloud" Journal of Emerging Trends in Computing and Information Sciences 3, No. 2 (2012): 262-266.

(Continued)

*Primary Examiner* — Oanh Duong
(74) *Attorney, Agent, or Firm* — Cantor Colburn LLP; Abdy Raissinia

(57) ABSTRACT

Aspects of the invention include selecting a node for an infrastructure update. The selected node is included in a cluster of nodes executing workloads that include containers. A future workload is prevented from being scheduled on the selected node. A workload currently executing on the selected node is migrated to another node included in the cluster of nodes. Infrastructure code on the selected node is updated, and in response to the updating, the ability to schedule a future workload on the selected node is enabled.

18 Claims, 7 Drawing Sheets

(56) References Cited

U.S. PATENT DOCUMENTS

| | | | |
|---|---|---|---|
| 2005/0060391 A1 | 3/2005 | Kaminsky et al. | |
| 2006/0037016 A1 | 2/2006 | Saha et al. | |
| 2009/0089777 A1 | 4/2009 | Fuller et al. | |
| 2009/0144720 A1 | 6/2009 | Roush et al. | |
| 2013/0151681 A1* | 6/2013 | Dournov | G06F 8/656 709/223 |
| 2016/0028688 A1* | 1/2016 | Chizhov | H04L 41/0226 726/12 |
| 2017/0346760 A1* | 11/2017 | Kelly | H04L 67/1097 |
| 2017/0366606 A1* | 12/2017 | Ben-Shaul | G06F 3/064 |
| 2018/0157517 A1* | 6/2018 | Dong | G06F 9/45558 |
| 2018/0183659 A1* | 6/2018 | MacNamara | G06F 9/45558 |
| 2018/0225149 A1* | 8/2018 | Bianchini | G06F 9/5016 |
| 2018/0276050 A1* | 9/2018 | Gong | G06F 9/5083 |
| 2019/0243687 A1* | 8/2019 | Chen | G06F 9/5072 |
| 2019/0250946 A1* | 8/2019 | Parameshwaran | G06F 9/455 |
| 2019/0379590 A1* | 12/2019 | Rimar | H04L 43/062 |
| 2020/0133706 A1* | 4/2020 | Koehler | G06F 9/45558 |
| 2020/0142753 A1* | 5/2020 | Harwood | G06F 9/45558 |

OTHER PUBLICATIONS

Automate Container Instance Draining in Amazon ACS: https://aws.amazon.com/blogs/compute/how-to-automate-container-instance-draining-in-amazon-ecs/, 7 pages, Oct. 4, 2018.

Automating Cluster Upgrades in OpenShift Container Platform: https://docs.openshift.com/container-plafform/3.7/upgrading/automated_upgrades.html, 12 pages, Oct. 4, 2018.

Disclosed Anonymous, "Performing Rolling Updates" Retrieved from Internet using: https://cloud.google.com/kubernetes-engine/docs/how-to/updating-apps, 9 pages, Dec. 4, 2019.

Draining Nodes in Docker Swarm: https://docs.docker.com/engine/swarm/swarm-tutorial/drain-node/,4 pages, Oct. 4, 2018.

Node Update Repair in Kubernetes Clusters: https://cloud.google.com/kubernetes-engine/docs/concepts/node-auto-repair, 3 pages, Oct. 4, 2018.

* cited by examiner

AUTOMATED INFRASTRUCTURE UPDATES IN A CLUSTER ENVIRONMENT THAT INCLUDES CONTAINERS

BACKGROUND

The present invention generally relates to updating an infrastructure, and more specifically, to providing automated infrastructure updates in a cluster environment that includes containers.

A cluster environment includes a group of servers and other resources that act like a single system and that can be used to provide high availability and, in some cases, load balancing and parallel processing. A cluster infrastructure provides the basic functions for a group of computers, or nodes, to work together as a cluster. Cluster infrastructure code executes on nodes in the cluster to perform functions such as cluster management, lock management, fencing, and cluster configuration management.

Containers isolate an application and its dependencies into a self-contained unit that can be moved from one computing environment to another. A container includes an entire runtime environment, including an application and all of its dependencies, libraries and other binaries, as well as configuration files needed to run the application, all bundled into one package. Rather than running an entire complex application inside a single container, the application can be split into modules (such as the database, the application front end, etc.). This is referred to as a micro-services approach, with each module referred to as a micro-service.

SUMMARY

According to one or more embodiments of the present invention, computer-implemented methods are provided for performing automated infrastructure updates in a cluster environment that includes containers. A non-limiting example computer-implemented method includes selecting, using a processor, a node for an infrastructure update. The selected node is included in a cluster of nodes executing workloads that include containers. A future workload is prevented from being scheduled on the selected node. A workload currently executing on the selected node is migrated to another node included in the cluster of nodes. Infrastructure code on the selected node is updated, and in response to the updating, the ability to schedule a future workload on the selected node is enabled.

Other embodiments of the present invention implement the features of the above-described methods in computer systems and in computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
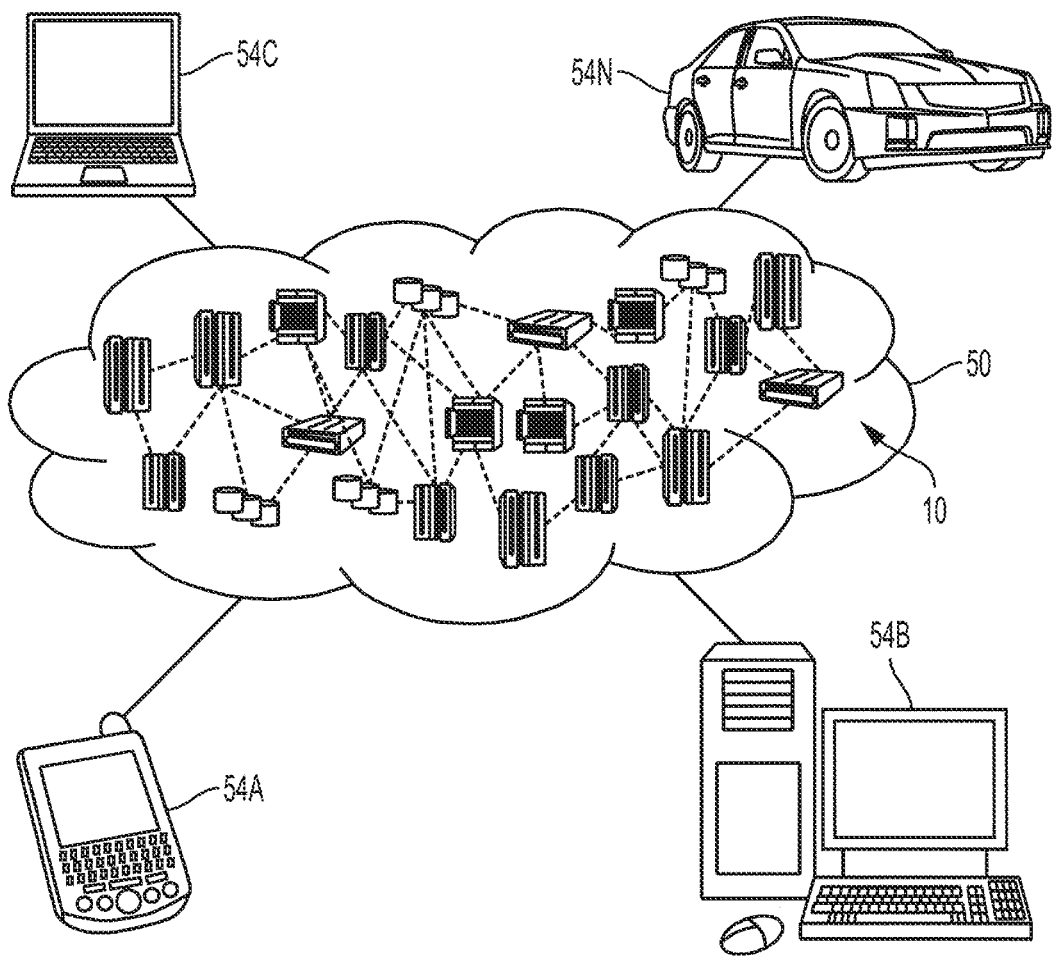
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number correspond to the figure in which its element is first illustrated.

DETAILED DESCRIPTION

One or more embodiments of the present invention provide automated infrastructure updates in a cluster environment that includes containers. This fully automated update process can be optimized to maximize performance and availability of hosted workloads, as well as to provide fast deployment times and low deployment costs. In addition, automatic validation and testing, as well as rollback capabilities are provided by one or more embodiments of the present invention. One or more embodiments of the present invention include an update service that includes a planner micro-service for selecting an optimal set of one or more nodes in a cluster to update, and an executor micro-service for managing the locking, draining, reloading, and testing of the one or more nodes in the optimal set of nodes. Based at least in part on an analysis performed by the planner micro-service, the optimal set may include a single node or a plurality of nodes for concurrent update.

One or more embodiments of the present invention provide the ability to switch a scheduler, located for example on a master node in a cluster, that places new jobs and workloads on nodes in the cluster into an update mode when an infrastructure update is expected or required. When in a normal mode, schedulers typically place the jobs and workloads across the nodes in the cluster to produce a well-balanced cluster that is efficient for running workloads under normal conditions. In accordance with one or more embodiments of the present invention, when a scheduler is in an update mode, the scheduler packs new jobs and workloads into a selected group of nodes in a cluster, thus steering new workloads to a subset of the nodes in the cluster. Packing can free up other nodes in the cluster, making them lightly occupied and good candidates for initial evictions during infrastructure updates. The more nodes evicted and updated concurrently, the sooner that workloads can be moved to them, freeing up another batch of nodes for update. Moving workloads to already updated nodes is more efficient than moving to another node that requires future eviction.

As described previously, a cluster environment includes a group of computers, or nodes, that act like a single system, and a cluster infrastructure provides the basic functions for the group of computers. Infrastructure code that includes cluster infrastructure code used by the nodes can execute on each node in the cluster. The functions of the cluster infrastructure include, but are not limited to: orchestration and launching containers, enforcement of resource limits, facilitating networks and disk communication, event management, and monitoring. In a cluster that includes containers, the infrastructure code can also include code related to underlying services such as, but not limited to kernel code of an operating system (OS), container orchestration code, container runtimes, and network plugins.

Also as described previously, containers are used to isolate an application and its dependencies into a self-contained unit that can be executed on any node in the cluster. A container includes an entire runtime environment, which can include, for example, an application, plus all of its dependencies, libraries and other binaries, as well as configuration files needed to run the application, all bundled into one package. Rather than run an entire complex application inside a single container, the application can be split into micro-services. As used herein, the term "pod" refers to a group of one or more containers, and the term "workload" refers to one or more pods or one or more containers that are currently executing on a node in a cluster.

Containers are contrasted with virtualization where the package that is passed between the nodes is a virtual machine (VM) which includes an entire OS as well as the application. In general, containers provide a way to virtualize an OS so that multiple workloads can run on a single OS instance, and in VMs it is the hardware that is being virtualized to run multiple OS instances. For example, a physical server, or node, running three VMs typically has a hypervisor and three separate OS s running on top of it. By contrast, a server running three containerized applications runs a single OS and each container shares the OS kernel with the other containers. Shared parts of the OS are read only, while each container has its own mount (i.e., a way to access the container) for writing. Thus, containers are typically more lightweight and use fewer resources than VMs. A benefit to using containers instead of VMs is that a container is smaller in size and therefore a single server can host more containers than VMs. Another benefit to using containers instead of VMs is that with each move to a different server, the VM needs to boot up the OS, while containers can be moved in an out quickly because they use the OS already executing on the node.

Kubernetes®, available from The Linux Foundation®, is one example of a commercially available product that can be utilized by one or more exemplary embodiments of the present invention to provide a framework, or cluster infrastructure code, for clustering and managing groups of nodes that are executing workloads that include containers. It is understood in advance that although this disclosure refers to a Kubernetes embodiment, implementation of the teachings recited herein are not limited to Kubernetes embodiments. Rather, embodiments of the present invention are capable of being implemented in conjunction with any other type of container infrastructure code now known or later developed. Examples of other commercially available products that can be utilized by one or more embodiments of the present invention include, but are not limited to: Docker, available from Docker Inc. and Apache Mesos available from Mesosphere, Inc.

Updates to infrastructure code occur regularly and may sometimes include critical updates, or patches, that must be applied as quickly as possible. An example of a critical patch is a security patch that may prevent high cost security breaches for service providers. Detecting compromised systems (e.g., those that an unauthorized person was able to access or that allowed execution of an unauthorized program) can require a full rebuild of the cluster, ideally without impacting the hosted services and applications. Compromised system cannot be trusted and it must be recreated along with other systems that may have been accessed or affected by the compromised system.

To perform the update, the active workloads must be migrated from the worker node, to another worker node. This migration, if not done efficiently can be time consuming and costly, and it can impact applications running in the cluster. Some of the updates to infrastructure code, referred to herein as "hotfixes" can be performed without bringing down the node. Other updates, such as those that involve significant updates to the kernel, require a full restart of the node. The terms "host" and "node" are used interchangeably herein to refer to processors in a cluster.

One or more embodiments of the present invention provide technological improvements over current methods for updating nodes in a cluster of nodes executing container workloads. Current methods execute the drain and update of nodes one at a time, in random batches of nodes, and/or in an order determined based on the name of the node. A disadvantage of contemporary approaches is that they are not efficient in terms of the number of times that a workload is moved from one node to another. Another disadvantage of contemporary approaches is that they do not take into account the actual workload distribution, which is constantly changing, each time that a new node is selected for update. A further disadvantage of contemporary approaches is the amount of time that it takes to perform each update sequentially.

Example embodiments of the present invention provide technical solutions to the above noted disadvantages of existing solutions by selecting a next set of nodes to update based on criteria such as, but not limited to the elapsed time it takes to perform the upgrade, the cost in terms of a number of times that each pod or workload is moved, and resilience in terms of the amount of service disruption that is caused by performing the update. For example, a minimum number of workloads or pods of particular types may be kept running at all times in order to avoid response time degradation during the updates.

Example embodiments of the present invention provide further technical solutions by allowing multiple nodes to be migrated concurrently (e.g., the migrations can overlap in time), thus reducing an elapsed time for all of the nodes in the cluster to be updated. Example embodiments of the present invention provide further technical solutions by providing the ability for a scheduler to be moved into an update mode that causes the scheduler to pack a selected subset of nodes with new jobs and workloads. This can optimize the update process to improve performance and availability of hosted workloads by shortening the update time. Contemporary approaches assume that management operations, such as applying updates and other maintenance operations, are performed either periodically or based on some carefully calculated times. Contemporary approaches do not address preparing for update operations that may occur at any point in time. One or more embodiments of the present invention prepare for update operations at any point in time by changing a mode of a scheduler to shift the workload among worker nodes in a cluster in order to achieve efficient infrastructure update operations.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
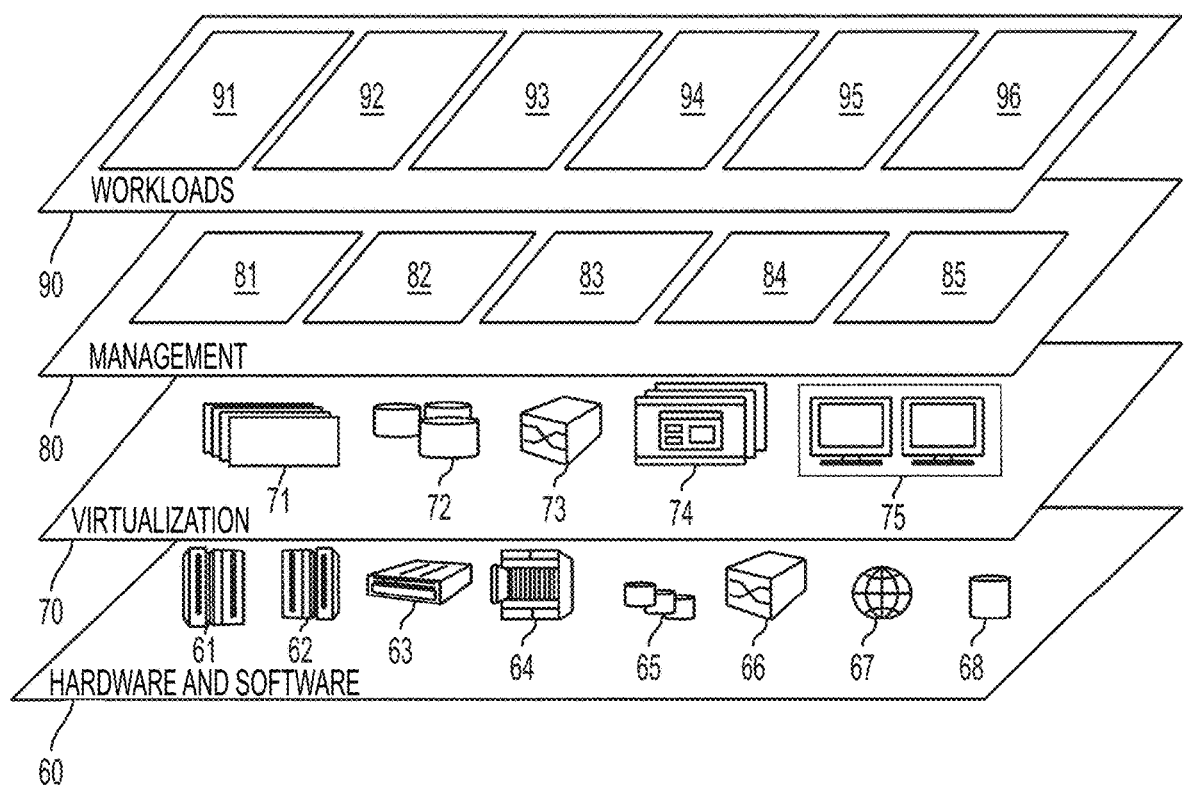
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an automated infrastructure update layer 96.

Figure 3:
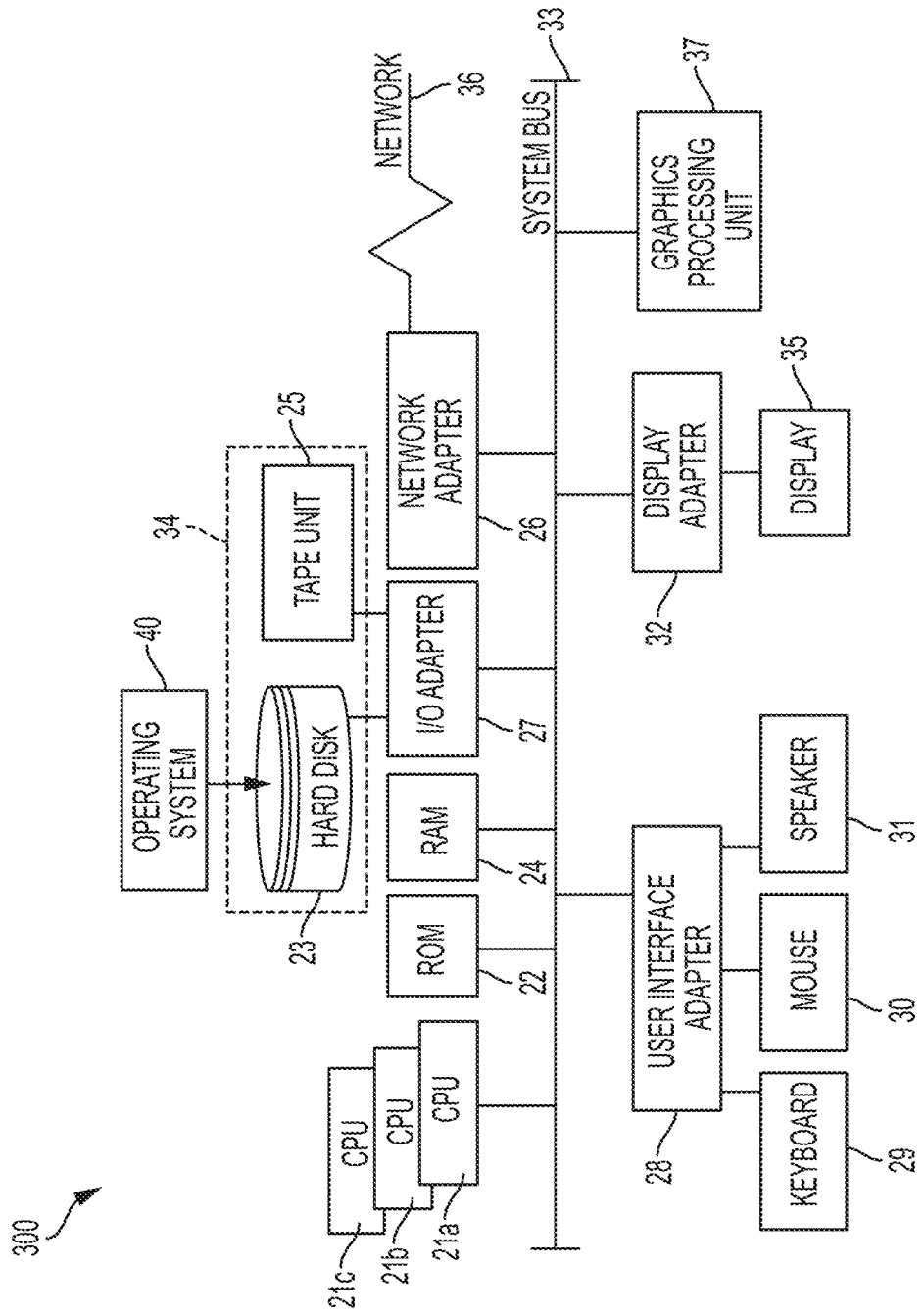
FIG. 3 depicts a processing system for implementing one or more embodiments of the present invention.

It is understood that one or more embodiments of the present invention are capable of being implemented in conjunction with any other type of computing environment now known or later developed. For example, FIG. 3 depicts a block diagram of a processing system 300 for implementing the techniques described herein. The processing system 300 is an example of a computing node 10 of FIG. 1. In the embodiment shown in FIG. 3, processing system 300 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 300.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage drive 25 are collectively referred to herein as mass storage 34. Operating system 40 for execution on processing system 300 can be stored in mass storage 34. The RAM 22, ROM 24, and mass storage 34 are examples of memory 19 of the processing system 300. A network adapter 26 interconnects system bus 33 with an outside network 36 enabling the processing system 300 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 300 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 300.

Figure 4:
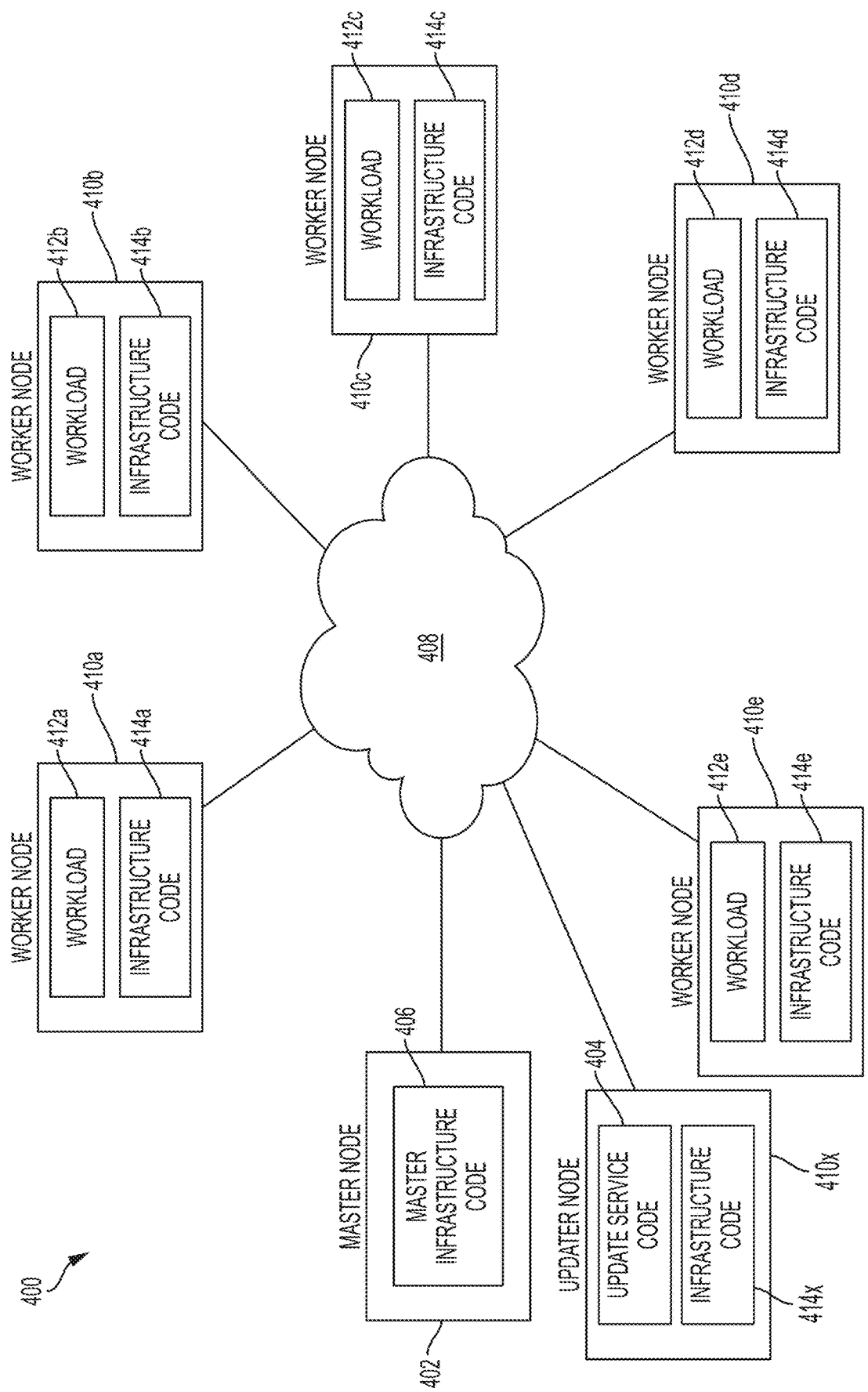
FIG. 4 depicts a high level block diagram of a system for performing automated infrastructure updates in a cluster environment that includes containers according to one or more embodiments of the present invention.

Turning now to FIG. 4, a high level block diagram of a system 400 for automated infrastructure updates in a cluster environment that includes containers is generally shown according to one or more embodiments of the present invention. At least a subset of the components of system 400 may be implemented by one or more cloud computing nodes 10 and local computing devices 54A-N of FIG. 1. For ease in description, the cluster shown in FIG. 4 includes five worker nodes 410a 410b 410c 410d 410e, referred to collectively herein as worker nodes 410, one worker node acting as an updater node 410x, and one master node 402. One skilled in the art will recognize that a typical cluster may include hundreds or thousands of worker nodes 410, and multiple updater nodes 410x and master nodes 402. The master node 402 shown in FIG. 4 hosts the applications that support the containers such as, but not limited to: an application programming interface (API) server, schedulers, queues, and event management. The master node 402 includes a master copy of the infrastructure code, shown in FIG. 4 as master infrastructure code 406. The worker nodes 410, updater node 410x, and master node 402 shown in FIG. 4 are communicating via a network 408 as part of a cloud computing environment such as cloud computing environment 50 of FIG. 1.

The updater node 410x shown in FIG. 4 includes infrastructure code 414x and a workload that includes update service code 404. In accordance with one or more embodiments of the present invention, the update service code 404 in the updater node 410x keeps track of the current workloads 412a 412b 412c 412d 412e (referred to herein collectively as workloads 412) running on the worker nodes 410 as well as the resources available to each of the worker nodes 410. The master infrastructure code 406 performs cluster control functions such as, but not limited to scheduling workloads on the worker nodes 410 and cluster configuration management. In accordance with one or more embodiments of the present invention the master infrastructure code 406 implements the scheduler described herein which operates in an update mode or a normal mode to schedule workloads on the worker nodes. In accordance with one or more embodiments of the present invention, the update service code 404 communicates with the master infrastructure code 406 on the master node 402 to obtain the information about the worker nodes used by the update service code 404 to determine an order of node updates and to perform the updates. The order of node updates can be determined, for example, using a planner micro-service container of the update service code 404 such as that described below in reference to block 702 of FIG. 7.

The worker nodes in the system 400 of FIG. 4 each include a workload 412 and infrastructure code 414a 414b 414c 414d 414e (referred to collectively herein as infrastructure codes 414). Each of the infrastructure codes 414 is at a pre-update software level or at a post-update software level.

Figure 5:
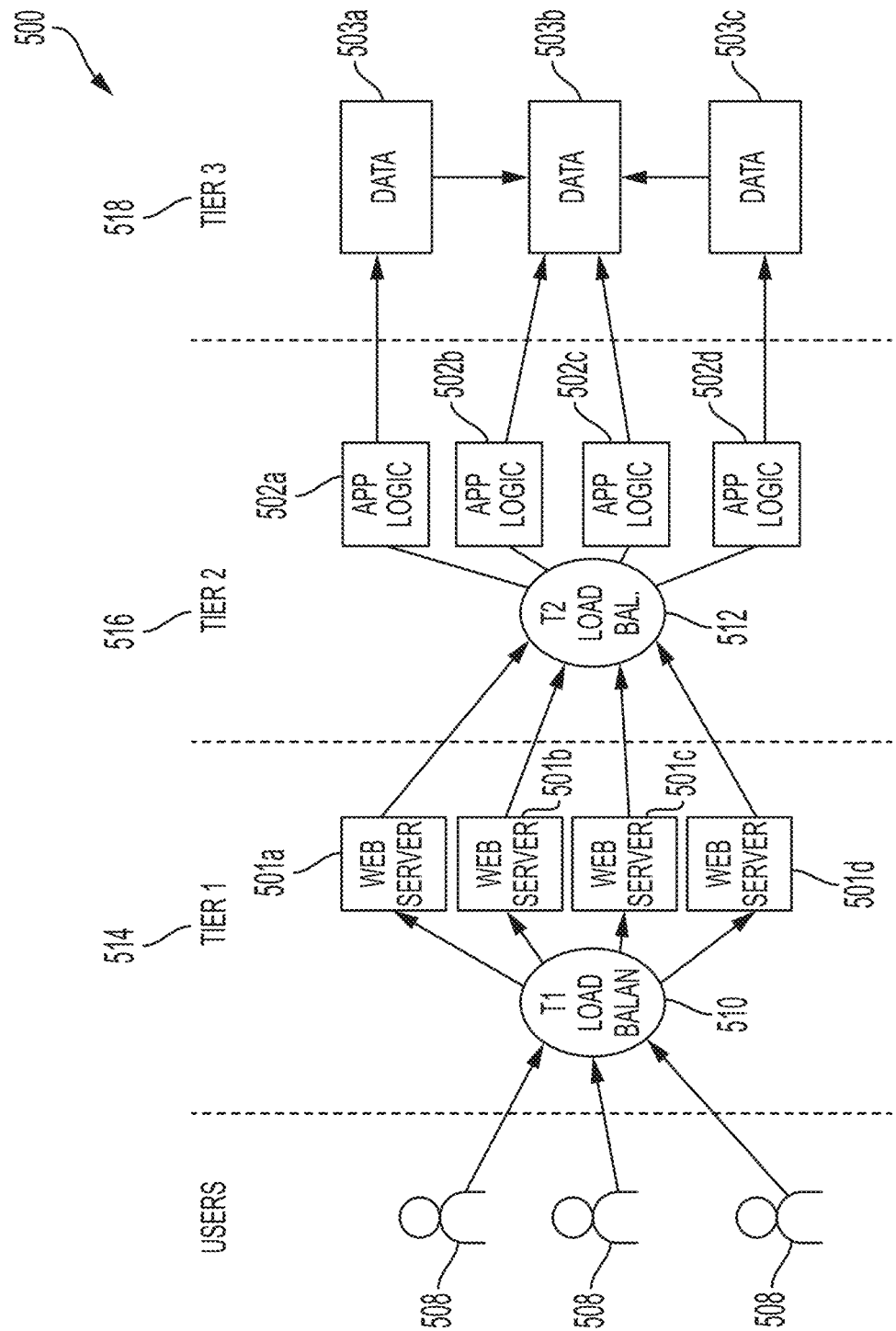
FIG. 5 depicts a block diagram of an example application that is deployed in a cluster using a three tier architecture according to one or more embodiments of the present invention.

Turning now to FIG. 5, a block diagram 500 of an example application that is deployed in a cluster using a three tier architecture is generally shown according to one or more embodiments of the present invention. The example application shown in FIG. 5 includes three tiers: Tier 1 514 which is a front-end presentation tier; Tier 2 516 that is a web application logic tier; and Tier 3 518 that is a data tier for providing persistent data. In the example application shown in FIG. 5, the presentation tier, Tier 1 514, is implemented by a web server that is shown as a collection of web server containers 501a 501b 501c 501d (referred to collectively herein as web server containers 501). The web server containers 501 may be implemented by any web server known in the art. Tier 1 514 also includes T1 load balancer 510 which is a service, executing for example on master node 402 of FIG. 4, that distributes requests between active web server containers 501. In accordance with one or more embodiments of the present invention, T1 load balancer 510 is a service and unlike the web server containers 501, the T1 load balancer 510 does not require migration. Tier 1 514 receives requests from users 508 and creates calls to Tier 2 516 for further processing. After receiving a response from Tier 2 516, Tier 1 514 responds to one or more of the users 508.

In the example application shown in FIG. 5, the web application logic tier, Tier 2 516, is implemented by application logic that is shown as a collection of application logic containers 502a 502b 502c 502d (referred to collectively herein as application logic containers 502). The web server containers 501 may be implemented by any programming language known in the art. Tier 2 516 also includes T2 load balancer 512 which is a service, executing for example on master node 402 of FIG. 4, that distributes calls been active application logic containers 502. In accordance with one or more embodiments of the present invention, T2 load balancer 512 is a service and unlike the application logic containers 502, the T2 load balancer 512 does not require migration. Tier 2 516 receives calls from Tier 1 514 and makes data calls to Tier 3 518. After completing the Tier 2 logic and business process, Tier 2 516 returns results back to Tier 1 514.

In the example application shown in FIG. 5, the data tier, Tier 3 518, is implemented by a data storage scheme that is shown as a collection of data containers 503a 503b 503c (referred to collectively herein as data containers 503). The data containers 501 may be implemented by any data scheme known in the art for storing data in a cluster. Tier 3 518 receives data calls from Tier 2 514 and returns results back to Tier 2 514.

In the example shown in FIG. 5, the disruption budget parameter for web server containers 501 and application logic containers 502 may be set to fifty percent, meaning that at any given time at least fifty percent of all of the containers of these types must be active and healthy (e.g., operating without errors).

It should be understood that the example application shown in FIG. 5 including the number of tiers, types of tiers, and implementations of the tiers are intended to be illustrative only and embodiments of the invention are not limited thereto.

Figure 6:
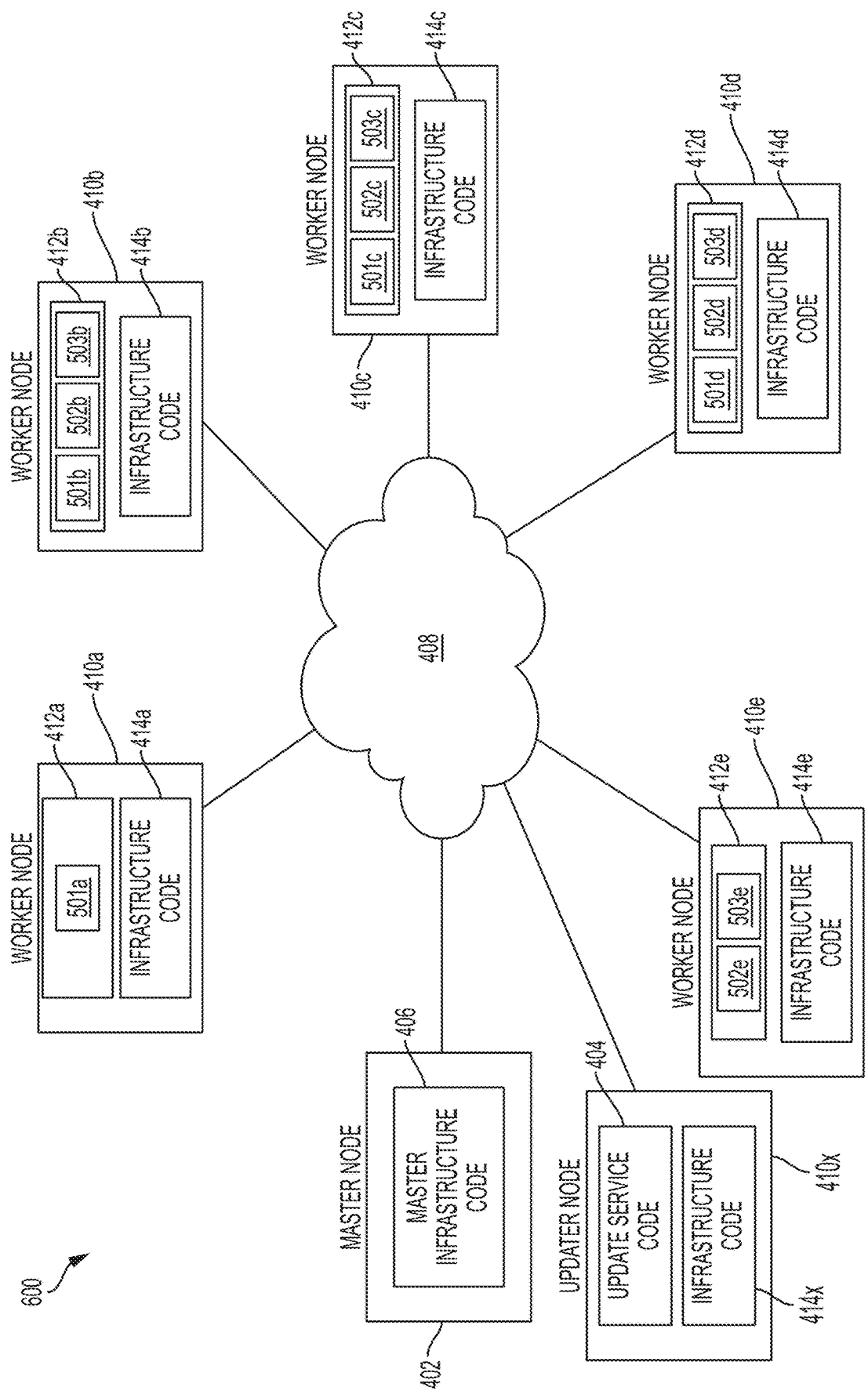
FIG. 6 depicts a block diagram of the example application of FIG. 5 deployed on the system of FIG. 4 according to one or more embodiments of the present invention.

Turning now to FIG. 6, a block diagram 600 illustrating a sample distribution of the workloads from FIG. 5 in the sample cluster shown in FIG. 4 is generally shown in accordance with one or more embodiments of the present invention. In the initial state shown in FIG. 6, web server containers 501 are distributed between workloads 412a, 412b, 412c and 412d; application logic containers 502 are distributed between workloads 412b, 412c, 412d and 412e; and data containers 503 are distributed between workloads 412b, 412c, 412d, and 412e.

An infrastructure update may be applied to the sample cluster shown in FIG. 4. For ease of description, it is assumed that other workers nodes where the current workloads can be migrated are available and that all the current workloads consume the same amount of resources (e.g., CPU, memory, disk, etc.). In accordance with one or more embodiments of the present invention update service code, such as update service code 404 of FIG. 4, reviews the current deployment of the containers in the cluster and starts the eviction process. In an embodiment, the update service code may select worker nodes 410a and 410e as the first ones to be updated as they have the lowest number of containers. In accordance with one or more embodiments of the present invention, as soon as web server container 501a is active at the new location, the update service code can start draining worker node 410d or 410c.

Figure 7:
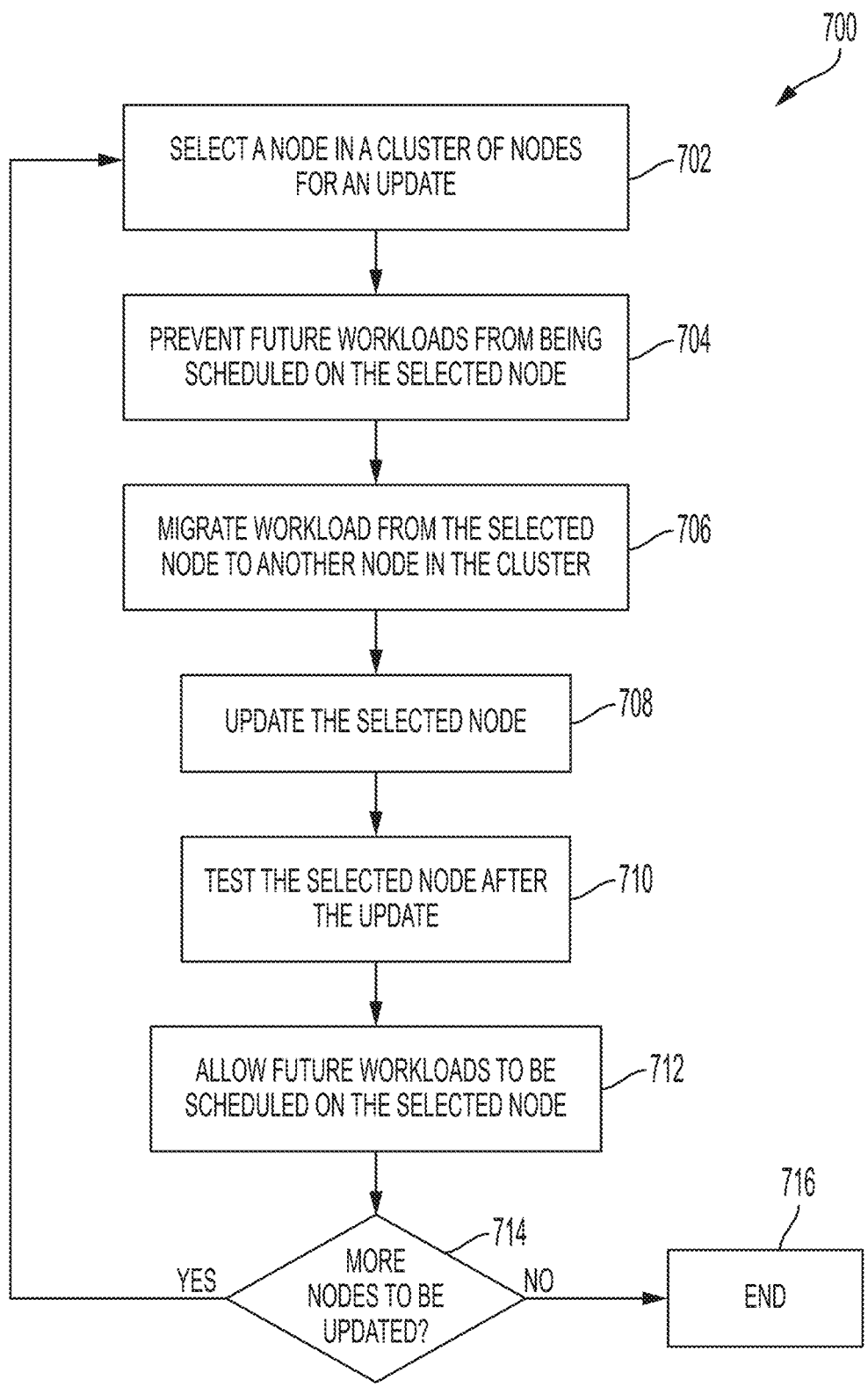
FIG. 7 depicts a flow diagram of a cluster upgrade process for performing automated infrastructure updates in a cluster environment that includes containers according to one or more embodiments of the present invention.

Turning now to FIG. 7, a flow diagram of a cluster upgrade process 700 for automated infrastructure updates in a cluster environment that includes containers is generally shown according to one or more embodiments of the present invention. In accordance with one or more embodiments of the present invention, the processing shown in FIG. 7 is performed by update service code, such as update service code 404 of FIG. 4. The update service code is implemented by program instructions executable by a processor. In accordance with one or more embodiments of the present invention, the cluster upgrade process 700 shown in FIG. 7 is initiated by a cluster administrator or an automated process when the new version is required (e.g., due to a security issue). In accordance with one or more embodiments of the present invention, the clusters have an API server running on a master node, such as master node 402 of FIG. 4, from which the update service code can obtain configurations for the cluster. The service provided by the API server is where configurations and information about the cluster can be retrieved and set. In accordance with one or more embodiments of the present invention, to perform an update, an update request object is created which details what kind of update should be performed, the steps (commands to execute), parameters (when the update should be done, and speed of update (e.g., weighting availability and other control knobs) which will be used to carry out the update.

In accordance with one or more embodiments of the present invention, there is an update service that is deployed as a container service in the cluster, such as update service code 404 of FIG. 4. This update service looks for update request objects, and when it detects the creation of one, it retrieves the request and starts the process of the update. In accordance with one or more embodiments of the present invention, the update service code 404 includes two containers, one that includes planner micro-service to determine an update order and another that includes an executor micro-service.

The cluster upgrade process 700 shown in FIG. 7 is repeated, or iterated, until all of the nodes in the cluster have been updated. At block 702 of FIG. 7, a set of one or more nodes, such as worker nodes 410 of FIG. 4, in a cluster of nodes is selected for an update. In accordance with one or more embodiments of the present invention, the selecting is performed by the planner micro-service to select an optimal set of one or more nodes to update during the current iteration. The aspects taken into account by the planner micro-service when selecting the set of one or more nodes can include, but are not limited to: the time that it takes to perform the update, the cost in terms of attempting to minimize redundant pod or container moves, and resilience in terms of attempting to minimize any service disruption caused by workload migration between nodes.

In accordance with one or more embodiments of the present invention the planner micro-service looks at the number of resources (e.g., containers or pods) on each node and the memory utilization on each node. Based on this information, the planner micro-service selects a set of one or more nodes that will minimize the amount of redundant work that might cause a service interruption such as, but not limited to, the startup of containers on nodes that have not yet been updated (and thus, any containers moved to these nodes will have to be moved again as part of the cluster upgrade). The planner micro-service can also select the set that is likely to minimize the amount of time taken to perform a full upgrade of the cluster. In addition, the planner micro-service can also ensure that a certain percentage of resources in the cluster are running at any point during the cluster upgrade. In accordance with one or more embodiments of the present invention, the planner micro-service has two phases, a measured upgrade phase and a fast upgrade phase.

The first phase, the measured upgrade phase selects a first set or sets of one or more nodes for upgrading that will minimize the startup of pods or containers on non-updated nodes. At the start of the cluster upgrade, when there are no updated nodes, and the measured upgrade phase is used to carefully select the first few nodes to upgrade. In accordance with one or more embodiments of the present invention, the selecting is performed using a ranking function approximation where each node is given a ranking value that signifies the likelihood that the node will satisfy one or more restrictions. The list of nodes is sorted based on the rankings and the selecting of the node(s) to include in the set of nodes for upgrade is based at least in part on the rankings. Examples of restrictions include, but are not limited to: an amount of slack, or unused resources, on the node, and a weight of edges into the node. In general, the more restrictions a node has the more important it is to the availability of the cluster and the higher the weight of the edges into the node. A node that currently has a light workload will take less time to migrate than a node that currently has a heavy workload, and thus the node with the lighter workload may be a better choice for an update in the first phase. In addition, dependencies between workloads on different nodes will be taken into account by one or more embodiments of the present invention when selecting a node to be updated. The measured upgrade phase is performed until a threshold percentage (e.g., twenty-five percent, fifty percent) of nodes has been upgraded. Once the threshold percentage has been met the measured upgrade phase ends and the fast upgrade phase begins. During the fast upgrade phase, all of the existing un-upgraded nodes are upgraded in quick succession.

In accordance with one or more embodiments of the present invention, the selecting of a set of nodes for upgrade by the planner micro-service is based at least in part on three considerations: meeting a disruption budget parameter, or cluster availability requirement (e.g., fifty percent of containers should be running at any point during the cluster upgrade); meeting a required capacity (e.g., given a potential configuration, does the cluster have enough resources to perform an upgrade on a set of nodes); and whether the cluster upgrade has moved from the measured upgrade phase to the fast upgrade phase (e.g., the cluster upgrade no longer needs to use un-upgraded nodes to store migrated workloads). Additional considerations can include geographic zones when a cluster includes nodes in two or more geographic locations. In this case it may be important that at least a specified minimum number of pods or containers of each type within the cluster are executing in each different geographic location covered by the cluster. Other considerations can include availability of particular zones or nodes, such as those used for disaster recovery. In the case of disaster recovery sites it may be important that at least a specified minimum number of pods or containers of each type within the cluster are executing in each disaster recovery site.

Referring back to FIG. 7, at block 704, an executor micro-service is notified of the one or more nodes in the set of nodes that have been selected for upgrade in the current iteration by the planner micro-service at block 702. At block 704, the executor micro-service locks the node(s) in the set to prevent future workloads from being scheduled on them by, for example, a master node in the cluster such as master node 402 of FIG. 4. At block 706, the node(s) in the set are evacuated, or drained, to migrate the existing workload from the node(s) in the set to other node(s) not being updated during the current iteration. The target node(s) can be either update or non-updated nodes depending, for example, on whether the update is in the measured upgrade phase or the fast upgrade phase. The selection of the target node can take into account whether the potential target node has enough resources to run the workload being migrated. Examples of resources required by a workload can include, but is not limited to: disk space, memory capacity, central processing unit (CPU) speed, network bandwidth, throughput and/or input/output (I/O) capabilities. Additionally, the selection of the target node can take into account legal requirements having to do with where a particular workload can be executed. For example, a particular workload may not be able to run in a particular country.

At block 708, the selected node(s) in the set are redeployed, or updated with the new version of the infrastructure code. The updated node(s) are automatically tested at block 710 for example, with a predefined test script. In accordance with one or more embodiment of the present invention, if the test is successful processing continues at block 712, and if the test is not successful the update of block 708 is repeated or the infrastructure code is rolled back to the infrastructure code executing on the node prior to the update. At block 712, the node(s) are unlocked and put back into the cluster to enable the scheduler to use the node to host workloads. Processing continues at block 714 where it is determined whether there are any more nodes in the cluster to be updated. If there are more nodes to be updated, then block 702 is performed by the planner micro-service to select a new set of one or more nodes for the update. If all of the nodes in the cluster have been updated, then processing continues at block 716 and the infrastructure update is complete.

In accordance with one or more embodiments of the present invention, the processing shown in blocks 702 through 714 is performed concurrently for multiple worker nodes.

In accordance with one or more embodiments of the present invention, an updater node, such as updater node 410x of FIG. 4, is updated by electing a new updater node from the worker nodes 410, and the newly elected updater node starts driving the updates. Though other scenarios are possible, typically, the updater node 410x is protected from updates until updates to all of the other worker nodes 410 are completed. Once all of the worker nodes have been updated, the infrastructure code on the updater node is updated.

As described previously, prior to performing the processing shown in FIG. 7, a scheduler implemented for example, by master infrastructure code 406 of FIG. 4, can enter an update mode that provides pre-planning for infrastructure updates by packing workloads into a subset of the nodes in a cluster. An example of this process follows for a host update on a container cloud cluster. In this example, the cluster is a Kubernetes cluster that includes ten worker nodes and various workloads running on the ten worker nodes. In this example, an update is performed on the kernel for all of the worker nodes, thus requiring a restart of the worker nodes. However, it is not desirable to disrupt workloads running on the cluster, and thus there are several restrictions put into place such as disruption budgets and pod affinities which the Kubernetes cluster must adhere to. In this example, the operation of performing the updates also considers the restrictions from the workloads, and optimizes for certain user requirements such as availability, performance, reliability and update time.

In this example, the set of resources are the worker nodes in the cluster as well as the workloads in the cluster, and the facts include the update version of each worker node, as well as the workload properties and resource allocations. The restrictions include the disruption budgets and pod affinity requirements, and the cost functions to optimize include the availability of services on the cluster (e.g., prefer to have a larger percentage of services available any point in time). In accordance with one or more embodiments of the present invention, the operation further includes performing a series of actions to migrate workloads from one worker node to another, and restarting and updating worker nodes. This can be performed using a planning process such as, but not limited to, the one described below.

An exemplary embodiment of an abstract model for performing the planning process follows. Consider a cluster containing a number of worker nodes, or host machines, where each worker node hosts a number of workloads, or tasks, each utilizing some resources on the worker node. Workloads arrive to the cluster according to some arrival process, and upon arrival, a workload is placed on a worker node by a scheduler, or placement engine. Once placed on a worker node, a workload remains in the cluster, or system, until it completes its execution. A task may be moved from one worker node to another worker node in the cluster by a migration controller such as update service code 404 of FIG. 4. At some point in time, "t", a management operation, or infrastructure update (e.g., update, scan, etc.), is scheduled to be performed on all of the worker nodes in the cluster. During such an operation, all worker nodes in the cluster are visited according to an update controller. A visited worker node is first emptied from all workloads hosted on the worker node, then the operation is performed on the worker node, after which the worker node is marked as visited and may host new and/or preexisting workloads.

Continuing with the abstract model and without loss of generality, it is assumed in this example that the worker nodes are lined up on an x-axis according to some ordering. An analysis may be easily conducted by assuming a continuum of worker nodes and a continuum of workflows (rather than discrete numbers). It can also be assumed that the scanning (worker node visiting) process starts from left to right at a given rate. Further, it can be assumed that a moving process clears tasks on worker nodes to the right of where the scanning process has reached, by moving workload (tasks) from right (non-visited worker nodes) to left (visited worker nodes) at a given rate. Such a rate depends on the amount of workload (hosted tasks) on the source worker node. In summary, given an initial load distribution on the worker nodes (prior to time t), the rates of progress for the scanning and moving processes are calculated. This may be modeled as a queueing (or inventory) system with two opposing processes: arrival and service processes. The impact of the initial load distribution on the efficiency of the operation, measured as the total time to visit all worker nodes, is formulated and an optimal distribution is obtained. The latter dictates the load skew that is needed before time t. Such a skew can be enforced by the placement engine prior to time t.

One or more embodiments of the present invention are directed to a planning operation to prepare a cluster for an infrastructure update of worker nodes in the cluster. In general, the techniques described herein are adaptive to most planning problems. A more detailed description of an embodiment of an abstract model for performing the planning process follows. Listed below are a definition and an instance of the planning operation to better illustrate how one or more embodiments of the present invention can benefit the planning problem. The operation on a cluster includes mainly of planning tasks. For example, an update of worker nodes in a production cluster is a planning task since a plan is need on how to update the worker nodes in order such that some important services can stay up, or available, for example to meet service level agreements (SLAs).

In accordance with one or more embodiments of the present invention, an informal definition of the operation includes: given a set of objects/resources and a set of facts about them, a set of actions performable to alter these facts, and a set of restrictions, perform a set of actions to achieve a goal (a certain set of desired facts); optimizing for a set of specified metrics. Packing can be used to distribute objects/resources into the cluster such that when an update is started, it allows a more optimal update of a cluster (optimizing the metrics via a set of actions), usually via reducing or limiting the number of restrictions.

In accordance with one or more embodiments of the present invention, a formal definition of the operation follows. The state of the cluster is defined as a set of resources R and a set of facts (predicates on resources). In addition, the actions on a cluster are defined as: action adds and/or removes facts of the cluster (a rule); and an action takes an amount of time to complete. A set of restrictions RES (predicates on resources) and cost functions COST (functions on resources, predicates and time) are defined, as well as a set of desired outcomes TARGET (a list of facts). The planning operation is defined as: given an initial cluster state I; in a loop, perform a series of actions on the cluster that attempts to adhere to restrictions in RES and optimize for functions in COST to achieve; and terminate upon satisfying predicates in TARGET. It is noted that there can be other actions performed by other entities which may result in a change of the cluster during the planning operation.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, include the module and achieve the stated purpose for the module.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one"

and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   selecting, using a processor, a node for an infrastructure update, the selected node included in a cluster of nodes executing workloads that include containers, each container including a self-contained runtime environment, the selecting based at least in part on an estimated number of times that each workload in the cluster will be migrated during the infrastructure update in response to the processor selecting the selected node;
   preventing, using the processor, a future workload from being scheduled on the selected node;
   migrating, using the processor, a workload currently executing on the selected node to another node included in the cluster of nodes, the workload executed by one or more containers that are migrated to the another node;
   updating, using the processor, infrastructure code on the selected node; and
   in response to the updating, enabling, using the processor, a future workload to be scheduled on the selected node.

2. The computer-implemented method of claim 1, further comprising prior to the selecting, steering by a scheduler, new workloads to a subset of the nodes in the cluster, the selected node not in the subset.

3. The computer-implemented method of claim 1, further comprising:
   determining, using the processor, whether all of the nodes in the cluster of nodes have been updated; and
   based at least in part on determining that all of the nodes in the cluster of nodes have not been updated, repeating the selecting, preventing, migrating, updating and enabling.

4. The computer-implemented method of claim 1, wherein the method further comprises:
   testing, using the processor, the updated infrastructure code on the selected node to determine whether the update was successful; and
   based at least in part on determining that the update was not successful, returning the infrastructure code to a pre-update state,
   wherein the enabling is further in response to determining that the update was successful.

5. The method of claim 1, wherein a second node is selected by the selecting for the infrastructure update, and the selected node and the second node are updated concurrently.

6. The method of claim 1, wherein the selecting is further based at least in part on current workloads executing on the nodes in the cluster.

7. The method of claim 1, wherein the selecting is further based at least in part on an estimated elapsed time to perform the infrastructure update in response to the processor selecting the selected node.

8. The method of claim 1, wherein the workloads are characterized by types and the selecting is further based at least in part on a minimum number of workloads of each type that are required to be executing at a given point in time.

9. The method of claim 1, wherein the preventing includes locking the selected node and the enabling includes unlocking the selected node.

10. A system comprising:
    a memory having computer readable instructions; and
    one or more processors for executing the computer readable instructions, the computer readable instructions controlling the one or more processors to perform operations comprising:
      selecting a node for an infrastructure update, the selected node included in a cluster of nodes executing workloads that include containers, each container including a self-contained runtime environment, the selecting based at least in part on an estimated number of times that each workload in the cluster will be migrated during the infrastructure update in response to the processor selecting the selected node;
      preventing a future workload from being scheduled on the selected node;
      migrating a workload currently executing on the selected node to another node included in the cluster of nodes, the workload executed by one or more containers that are migrated to the another node;
      updating infrastructure code on the selected node; and
      in response to the updating, enabling a future workload to be scheduled on the selected node.

11. The system of claim 10, wherein the operations further comprise, prior to the selecting, steering by a scheduler, new workloads to a subset of the nodes in the cluster, the selected node not in the subset.

12. The system of claim 10, wherein the operations further comprise:
    determining, whether all of the nodes in the cluster of nodes have been updated; and
    based at least in part on determining that all of the nodes in the cluster of nodes have not been updated, repeating the selecting, preventing, migrating, updating and enabling.

13. The system of claim 10, wherein the operations further comprise:
    testing the updated infrastructure code on the selected node to determine whether the update was successful; and
    based at least in part on determining that the update was not successful, returning the infrastructure code to a pre-update state,
    wherein the enabling is further in response to determining that the update was successful.

14. The system of claim 10, wherein a second node is selected by the selecting for the infrastructure update, and the selected node and the second node are updated concurrently.

15. A computer program product comprising a computer readable storage medium having program instructions embodied therewith, the program instructions executable by a processor to cause the processor to perform operations comprising:

selecting a node for an infrastructure update, the selected node included in a cluster of nodes executing workloads that include containers, each container including a self-contained runtime environment, the selecting based at least in part on an estimated number of times that each workload in the cluster will be migrated during the infrastructure update in response to the processor selecting the selected node;

preventing a future workload from being scheduled on the selected node;

migrating a workload currently executing on the selected node to another node included in the cluster of nodes, the workload executed by one or more containers that are migrated to the another node;

updating infrastructure code on the selected node; and in response to the updating, enabling a future workload to be scheduled on the selected node.

16. The computer program product of claim 15, wherein the operations further comprise, prior to the selecting, steering by a scheduler, new workloads to a subset of the nodes in the cluster, the selected node not in the subset.

17. The computer program product of claim 15, wherein the operations further comprise:

determining, whether all of the nodes in the cluster of nodes have been updated; and based at least in part on determining that all of the nodes in the cluster of nodes have not been updated, repeating the selecting, preventing, migrating, updating and enabling.

18. The computer program product of claim 15, wherein the operations further comprise:

testing the updated infrastructure code on the selected node to determine whether the update was successful; and based at least in part on determining that the update was not successful, returning the infrastructure code to a pre-update state, wherein the enabling is further in response to determining that the update was successful.

* * * * *